(12) United States Patent
Hall et al.

(10) Patent No.: US 7,227,844 B1
(45) Date of Patent: Jun. 5, 2007

(54) NON-STANDARD CONCATENATION MAPPING FOR PAYLOADS

(75) Inventors: Robert A. Hall, Richardson, TX (US); Lane B. Quibodeaux, Allen, TX (US); Andrew J. Thurston, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 1147 days.

(21) Appl. No.: 09/789,849

(22) Filed: Feb. 21, 2001

(51) Int. Cl.
*G01R 31/08* (2006.01)
(52) U.S. Cl. .................. 370/242; 370/474; 370/477
(58) Field of Classification Search .............. 370/242, 370/477, 470, 522, 401, 413
See application file for complete search history.

(56) References Cited

U.S. PATENT DOCUMENTS

| | | | |
|---|---|---|---|
| 4,700,358 A * | 10/1987 | Duncanson et al. ........ | 375/222 |
| 4,998,242 A * | 3/1991 | Upp ........................... | 370/392 |
| 5,257,261 A * | 10/1993 | Parruck et al. ............. | 370/522 |
| 5,461,618 A * | 10/1995 | Chen et al. ................. | 370/470 |
| 5,574,719 A * | 11/1996 | Ishiwatari .................... | 370/351 |
| 5,835,602 A * | 11/1998 | Lang ........................... | 380/268 |
| 5,841,760 A * | 11/1998 | Martin et al. ................ | 370/242 |
| 5,867,502 A * | 2/1999 | Chang ......................... | 370/477 |
| 6,249,525 B1 * | 6/2001 | Aggarwal et al. ........... | 370/413 |
| 6,275,499 B1 * | 8/2001 | Wynn et al. ................. | 370/438 |
| 6,446,232 B1 * | 9/2002 | Chan et al. .................. | 714/746 |
| 6,567,413 B1 * | 5/2003 | Denton et al. ............... | 370/401 |
| 6,628,651 B1 * | 9/2003 | Ryan et al. .................. | 370/369 |
| 6,631,134 B1 * | 10/2003 | Zadikian et al. ........ | 370/395.21 |
| 6,636,529 B1 * | 10/2003 | Goodman et al. ........... | 370/469 |
| 6,721,336 B1 * | 4/2004 | Witel et al. .................. | 370/474 |
| 6,751,743 B1 * | 6/2004 | Theodoras et al. ......... | 713/400 |
| 6,801,548 B1 * | 10/2004 | Duschatko et al. ......... | 370/537 |
| 6,831,932 B1 * | 12/2004 | Boyle et al. ................. | 370/539 |
| 6,870,860 B1 * | 3/2005 | Meagher et al. ............ | 370/535 |
| 6,944,163 B2 * | 9/2005 | Bottorff et al. .......... | 370/395.5 |
| 6,957,246 B1 * | 10/2005 | Hall et al. ................... | 709/200 |
| 6,977,889 B1 * | 12/2005 | Kawaguchi et al. ........ | 370/228 |
| 7,016,357 B1 * | 3/2006 | Wellbaum et al. ..... | 370/395.51 |

OTHER PUBLICATIONS

Aritcle "Extending PPP over SONET/SDH, with virtual concatenation, high order & low order payloads", N. Jones, C. Murton, Dec. 1999.*
Article "Extending PPP over SONET/SDH, with virtual concatention, high order & low order payloads", N. Jones, C. Murton, Dec. 1999.*

* cited by examiner

*Primary Examiner*—Wing Chan
*Assistant Examiner*—Andrew C. Lee
(74) *Attorney, Agent, or Firm*—Campbell Stephenson Ascolese LLP

(57) ABSTRACT

A method, apparatus and system are disclosed that more efficiently maps data into standard SONET concatenated payloads for transmission over established SONET networks. Framing information is added to a data stream to identify the beginning and ending locations of a payload. Next, the framed data stream is formatted into a non-standard STS-Nc packet. Two or more non-standard STS-Nc packets are combined to form a pseudo-standard STS-Nc packet that is supported by the established SONET network. According to one embodiment, a one Gbps Ethernet packet is framed using HDLC formatting, then formatted into an STS-24c packet. Two STS-24c packets are combined to form a pseudo-standard STS-48c packet. In addition, the one Gbps Ethernet packet can be stored and retimed to the SONET data rate and transmitted across an established SONET network.

85 Claims, 10 Drawing Sheets

|   | 1 | 2 | 3 |
|---|---|---|---|
| 1 | A1 | A2 | J0/Z0 |
| 2 | B1 | E1 | F1 |
| 3 | D1 | D2 | D3 |
| 4 | H1 | H2 | H3 |
| 5 | B2 | K1 | K2 |
| 6 | D4 | D5 | D6 |
| 7 | D7 | D8 | D9 |
| 8 | D10 | D11 | D12 |
| 9 | S1/Z1 | M0 OR M1/Z2 | E2 |

TRANSPORT OVERHEAD

| J1 |
|---|
| B3 |
| C2 |
| H4 |
| G1 |
| F2 |
| Z3 |
| Z4 |
| Z5 |

PATH OVERHEAD

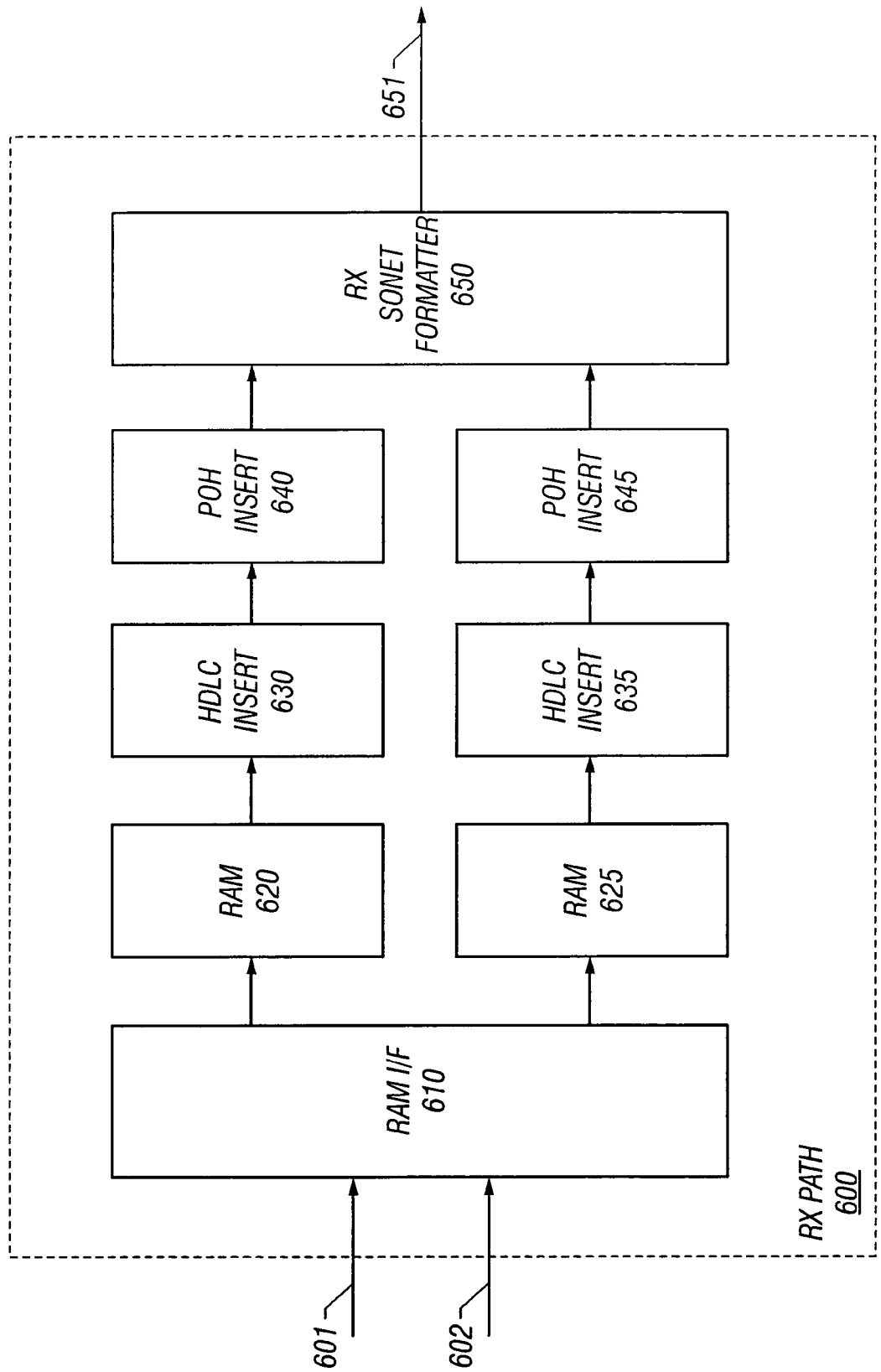

NON-STANDARD CONCATENATION MAPPING FOR PAYLOADS

BACKGROUND OF THE INVENTION

1. Field of the Invention

The present invention relates data communications, and more particularly, efficiency in the transmission of data across a SONET network.

2. Description of the Related Art

A data communications network is the interconnection of two or more communicating entities (i.e., data sources and/or sinks) over one or more data links. A data communications network allows communication between multiple communicating entities over one or more data communications links. High bandwidth applications supported by these networks include streaming video, streaming audio, and large aggregations of voice traffic. In the future, the demands for high bandwidth communications are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among several protocols designed to employ an optical infrastructure. SONET is widely employed in voice and data communications networks. SONET is a physical transmission vehicle capable of transmission speeds in the multi-gigabit range, and is defined by a set of electrical as well as optical standards. A similar standard to SONET is the Synchronous Digital Hierarchy (SDH) which is the optical fiber standard predominantly used in Europe. There are only minor differences between the two standards. Accordingly, hereinafter any reference to the term SONET refers to both SDH and SONET networks, unless otherwise noted.

SONET utilizes a byte interleaved multiplexing scheme. Multiplexing enables one physical medium to carry multiple signals. Byte interleaving simplifies multiplexing and offers end-to-end network management. See Bellcore Generic Requirements document GR-253-CORE (Issue 2, December 1995), hereinafter referred to as the "SONET Specification," and incorporated herein by reference for all purposes. The first step in the SONET multiplexing process involves the generation of the lowest level or base signal. In SONET, this base signal is referred to as synchronous transport signal-level 1, or simply STS-1, which operates at 51.84 Mbps (Megabits per second). Data between adjacent nodes is transmitted in these STS modules. Each STS is transmitted on a link at regular time intervals (for example, 125 microseconds) and grouped into frames. Higher-level signals are integer multiples of STS-1, creating the family of STS-N signals in Table 1. An STS-N signal is composed of N byte-interleaved STS-1 signals. Table 1 also includes the optical counterpart for each STS-N signal, designated optical carrier level N(OC-N).

TABLE 1

| SIGNAL | BIT RATE (Mbps) |
| --- | --- |
| STS-1, OC-1 | 51.840 |
| STS-3, OC-3 | 155.520 |
| STS-12, OC-12 | 622.080 |
| STS-48, OC-48 | 2,488.320 |
| STS-192, OC-192 | 9,953.280 |

NOTE:
Mbps = Megabits per second
STS = synchronous transport signal
OC = optical carrier SONET organizes STS data streams into frames, consisting of transport overhead and a synchronous payload envelope. The overhead consists of information that allows the network to operate and allow communications between a network controller and nodes. The transport overhead includes framing information and pointers, and performance monitoring, communications, and maintenance information. The synchronous payload envelope is the data to be transported throughout the network, from node to node until the data reaches its destination.

FIG. 1A illustrates the frame format of the STS-1 signal. In general, the frame can be divided into two main areas: a transport overhead and a synchronous payload envelope (SPE). The transport overhead is three columns wide by nine rows deep, a total of 27 bytes. The SPE is 87 columns wide by 9 rows deep, a total of 783 bytes. The payload is the revenue-producing traffic being transported and routed over the SONET network. Once the payload is multiplexed into the SPE, it can be transported and switched though SONET systems without having to be examined and possibly de-multiplexed at intermediate nodes. SPEs can have any alignment within the frame. The alignment of the SPE is indicated by pointer bytes in the transport overhead. An entire STS-1 frame is transported in 125 microseconds, at a bit rate of 51.84 Mbps. The order of transmission of bits is row-by-row from top to bottom and from left to right (most significant bit first).

FIG. 1B illustrates an STS-N frame format. An STS-N is formed by byte-interleaving N STS-1 modules. The transport overhead of the individual STS-1 modules are frame aligned before interleaving, but the associated STS SPEs are not required to be aligned because each STS-1 has a payload pointer to indicate the location of the SPE or to indicate concatenation. A concatenated SONET signal, represented as STS-Nc, is a signal in which the STS envelope capacities from the N STS-1 signals have been combined to carry an STS-Nc SPE. In some systems, such as certain ISDN and ATM systems, the STS-Nc signal is used to transport data envelopes that do not fit into an STS-1 (52 Mbps) payload. To accommodate such a payload an STS-Nc module is formed by linking N constituent STS-1s together in fixed phase alignment. The payload is then mapped into a single STS-Nc Synchronous Payload Envelope (SPE) for transport. Network equipment supporting the multiplexing, switching or transport of STS-Nc SPEs treat an STS-Nc SPE as a single entity. When an STS-Nc SPE is treated as a single entity, concatenation indicators are present in the second through the Nth STS payload pointers that show that the STS-1s in the STS-Nc are linked together. Up to three STS-1 signals can be concatenated into an STS-3c. Beyond STS-3, concatenation is in multiples of STS-3c.

Established SONET networks support only STS-3c, STS-12c and STS-48c payloads (referred to as "standard STS-Nc payloads"). This leads to inefficiently mapped large payloads into SONET payloads. For example, from a bandwidth standpoint, a one Gbps (Gigabits per second, also referred to as simply "Gigabit") Ethernet payload is preferably mapped into an STS-21c payload. The SPE of the STS-21c payload is 21×87 columns×9 row bytes every 125 microseconds (21×87 columns×9 rows×8 bits/bytes×8000 cycles/second). If sent across an established SONET network, the one Gbps Ethernet payload would be mapped into an STS-48c payload and filled with null data, not utilizing over half of the SONET bandwidth.

A solution is needed that more efficiently maps large payloads into concatenated SONET payloads while still being compatible with existing SONET network devices.

SUMMARY OF THE INVENTION

In accordance with the present invention, a method, apparatus and system are disclosed that more efficiently maps data into standard SONET concatenated payloads for transmission over established SONET networks. Framing information is added to a data stream to identify the beginning and ending locations of a payload. Next, the framed data stream is formatted into a non-standard STS-Nc packet. Two or more non-standard STS-Nc packets are combined and formatted to form a pseudo-standard STS-Nc packet that is supported by the established SONET network. According to one embodiment, a one Gbps Ethernet packet is framed using HDLC formatting, then formatted into an STS-24c packet. Two STS-24c packets are combined to form a pseudo-standard STS-48c packet. In addition, the one Gbps Ethernet packet can be stored and retimed to the SONET data rate and transmitted across an established SONET network.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIGS. 6A–6B illustrate an exemplary receive data path according to an embodiment of the present invention.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention that is defined in the claims following the description.

Figure 1A:
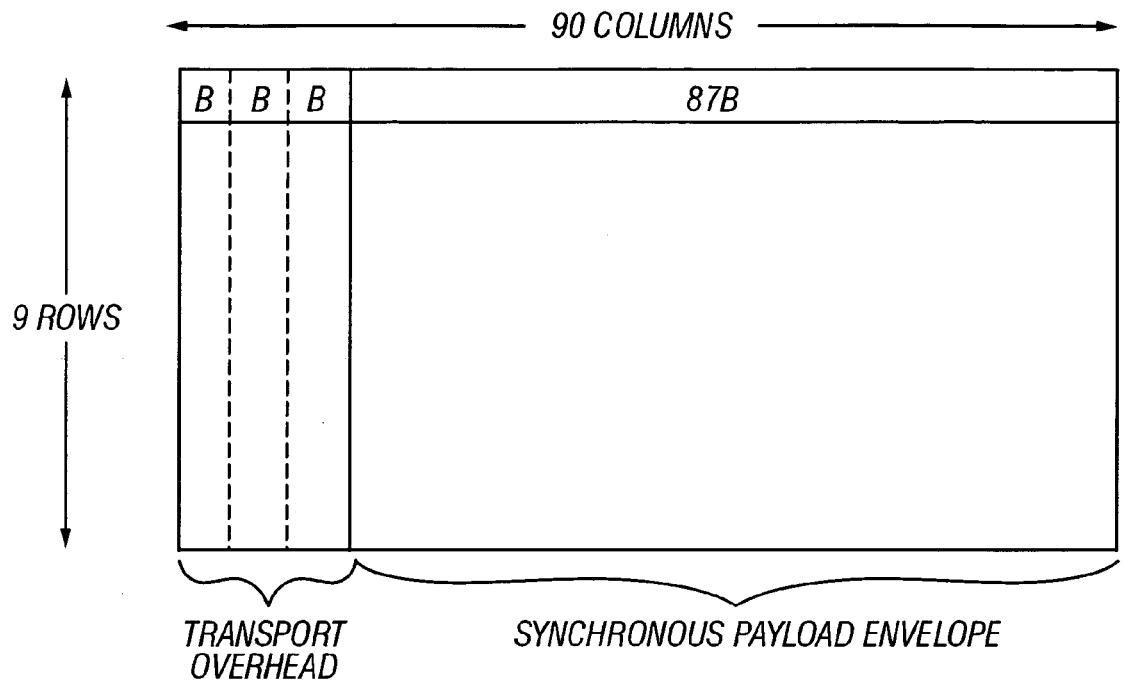
FIGS. 1A–1C illustrate frame formats of SONET frames of the prior art.
Figure 1B:
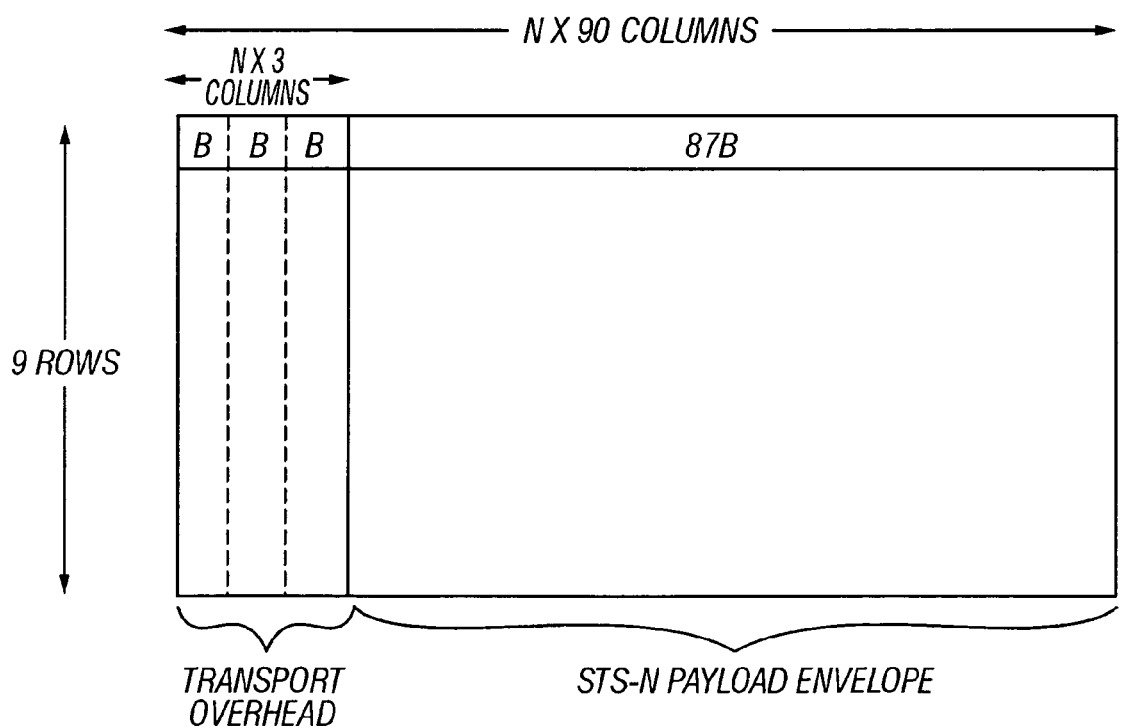
Figures 1C, 2:
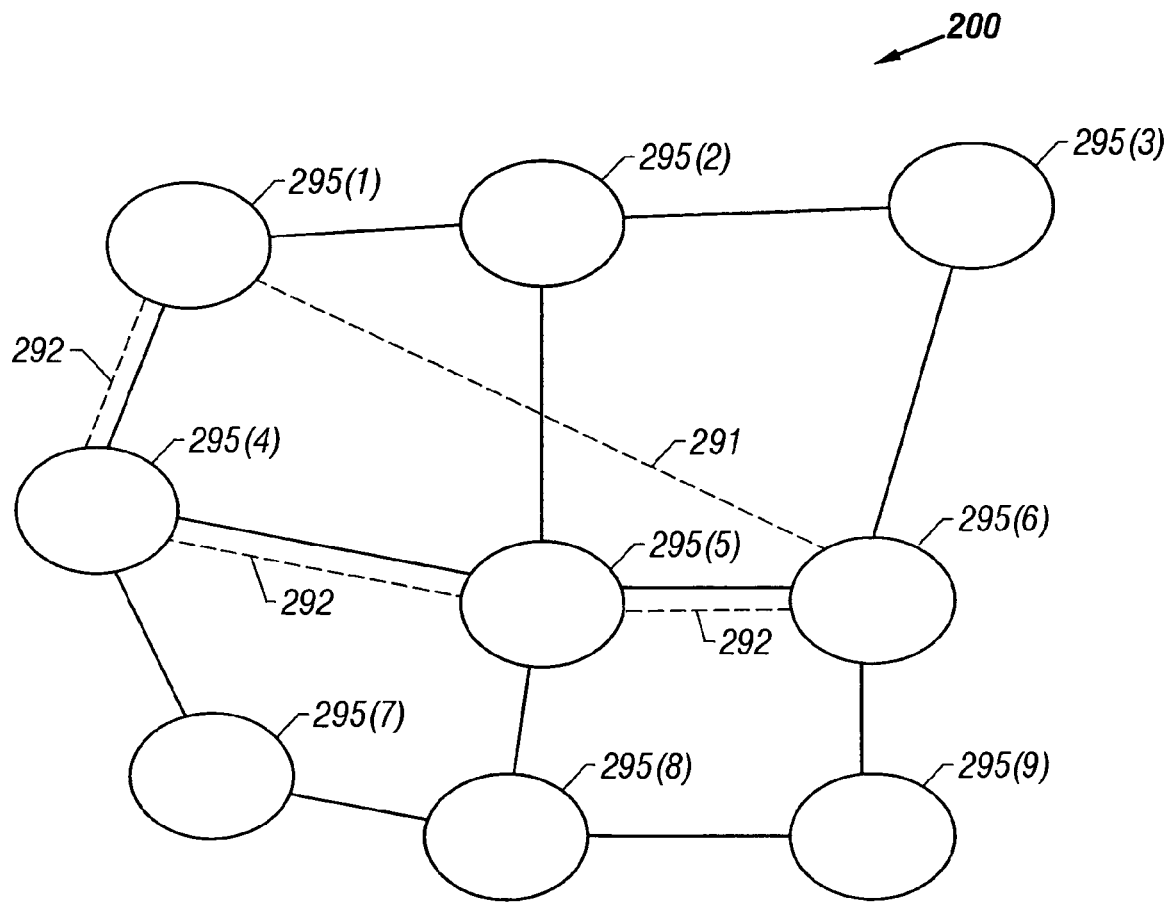
FIG. 2 illustrates a network environment in which embodiments of the present invention may be practiced.

FIG. 1C illustrates the location of overhead bytes according to the SONET specification. SONET overhead information provides for multiplexing and operations, administration, maintenance, and provisioning (OAM&P) capabilities. SONET overhead information allows the network to operate and allows OAM&P communications between an intelligent network controller and the individual nodes. Types of overhead include section overhead, line overhead, and STS path overhead (POH).

The transport overhead is composed of nine bytes of section overhead and 18 bytes of line overhead. Section overhead is accessed, generated and processed by section terminating equipment (STE). Section overhead supports functions such as performance monitoring, local orderwire, data communication channels to carry information for OAM&P, and framing. Referring to FIG. 1C, the section overhead is found in the first three rows of transport overhead. A1 and A2 framing bytes are used to indicate the beginning of a frame. J0/Z0 is a section trace byte (in the first STS-1 of the STS-N) or a section growth byte (in the second through Nth STS-1s). B1 is a section bit-interleaved parity code (BIP-8) byte used to check for transmission errors over a regenerator section. E1 is a section orderwire byte used as a local orderwire channel for voice communication between regenerators, hubs, and remote terminal locations. F1 is a section user channel byte set aside for the users' purposes. It terminates at all section-terminating equipment within a line. It can be read and written to at each section-terminating equipment in that line. D1, D2 and D3 are section data communications channel (DCC) bytes used from a central location for alarms, control, monitoring, administration, and other communication needs.

Line overhead contains 18 bytes of overhead accessed, generated, and processed by line-terminating equipment (LTE). Line overhead supports functions such as locating the SPE in the frame, multiplexing or concatenating signals, performance monitoring, automatic protection switching, and line maintenance. Referring to FIG. 1C, line overhead is found in rows 4 to 9 of the transport overhead. H1 and H2 are STS payload pointers that indicate the offset in bytes between the pointer and the first byte of the STS SPE. These bytes are also used to indicate concatenation and to detect STS path alarm indication signals (AIS-P). H3 is a pointer action byte used in all STS-1s within an STS-N to carry the extra SPE byte in the event of a negative pointer adjustment. B2 is a line bit-interleaved parity code (BIP-8) byte used to determine if a transmission error has occurred over a line. K1 and K2 are automatic protection switching (APS channel) bytes used for protection signaling between line-terminating entities for bi-directional automatic protection switching and for detecting alarm indication signal (AIS-L) and remote defect indication (RDI) signals. D4 to D12 are line data communications channel (DCC) bytes used for OAM&P information (alarms, control, maintenance, remote provisioning, monitoring, administration, and other communication needs) between line entities. S1/Z1 is a synchronization status byte used to convey the synchronization status of the network element in the first STS-1 of an STS-N and a growth byte allocated for future growth in the second through Nth STS-1s of an STS-N. M0 or M1/Z2 is defined according to type of STS signal. M0 is used for a line remote error indication function (REI-L) which conveys the error count detected by an LTE (using the line BIP-8 code) back to its peer LTE defined for STS-1 in an OC-1 or STS-1 electrical signal. The M1 byte is located in the third STS-1 (in order of appearance in the byte-interleaved STS-N electrical or OC-N signal) in an STS-N (N>=3) and is used for a REI-L function. The Z2 byte is located in the first and second STS-1s of an STS-3 and the first, second, and fourth through Nth STS-1s of an STS-N (12<=N<=48) and is allocated for future growth. E2 is an orderwire byte that provides a 64-kbps channel between line entities for an express orderwire.

The SPE can be divided into two parts: a STS path overhead (POH) and a payload. The first column of bytes in the SPE is the POH. Path overhead contains 9 evenly distributed bytes per 125 microseconds starting at the first byte of the STS SPE. Path overhead provides for communication between the point of creation of an STS SPE and its point of disassembly. Path overhead supports functions such as performance monitoring of the STS SPE, signal labeling, path status, and path trace. Referring to FIG. 1C, the POH is found in rows 1 to 9 of the first column of the STS-1 SPE. The POH portion of the SPE remains with the payload until it is demultiplexed. J1 is a STS path trace byte that repetitively transmits a format string allowing the receiving terminal in a path to verify its continued connection to the intended transmitting terminal. B3 is a STS path bit-interleaved parity code (path BIP-8) byte used to determine if a transmission error has occurred over a path. C2 is a STS path signal label byte used to indicate the content of the STS SPE, including the status of the mapped payloads. G1 is a path status byte used to convey the path-terminating status and performance back to the originating path-terminating equipment. Bits 1 through 4 are allocated for an STS path REI function (REI-P). Bits 5, 6, and 7 of the G1 byte are allocated for an STS path RDI (RDI-P) signal. Bit 8 of the G1 byte is currently undefined. F2 is a path user channel byte used for user communication between path elements. H4 is a VT multiframe indicator byte that provides a generalized multiframe indicator for payload containers.

FIG. 2 illustrates a network environment in which embodiments of the present invention may be practiced. Network 200 includes a number of nodes, network nodes 295 (1)–(N). One or more of network nodes 295(1)–(N) can be a router such as router 300, described in FIG. 3, or any other type of telecommunication hub such as a repeater. Network 200 can support the automatic provisioning, testing, restoration, and termination of virtual paths (exemplified by a virtual path 291) over a physical path (exemplified by a physical path 292) from one of network nodes 295(1)–(N) to another of network nodes 295(1)–(N). The links between the nodes of network 200, and so physical path 292, can utilize fiber-optic cables, for example. While copper cabling may also be employed, such an option may not offer the speed and number of connections provided by optical technologies.

Figure 3:
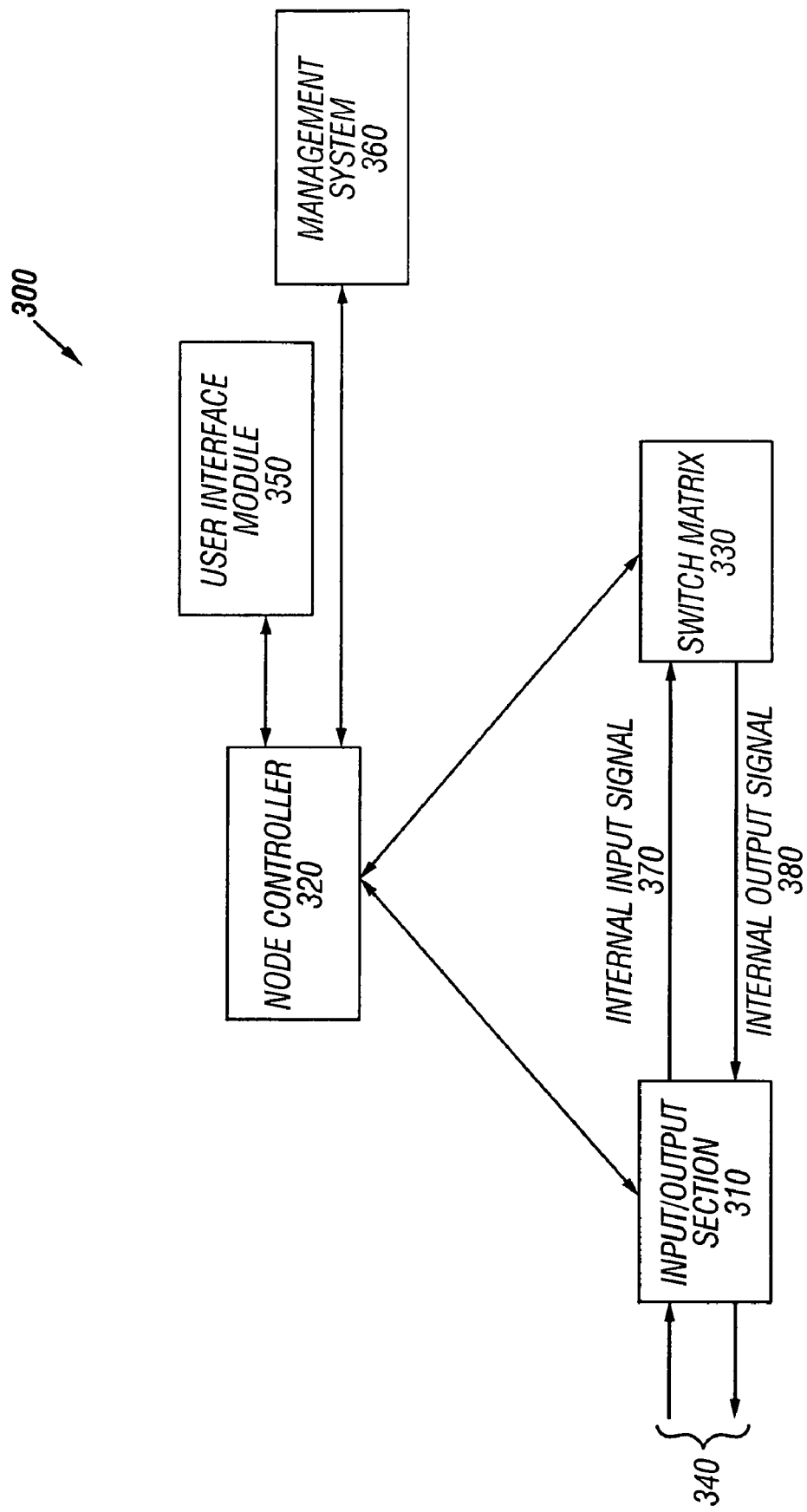
FIG. 3 illustrates a block diagram of an exemplary router.

FIG. 3 illustrates a block diagram of an exemplary router 300. Router 300 is a high-capacity telecommunication network device based on optical technologies and components that provides routing, grooming and restoration at wavelength levels as well as wavelength-based services. Router 300 interconnects routers and switches across an optical transport network, accepting various wavelengths on input ports and routing them to appropriate output ports in the network. Router 300 provides routing for traffic at wavelength granularities, e.g., OC-48 or OC-192, and enables functionality to be controlled by software managed centrally.

Router 300 includes an input/output section 310, a node controller 320, and a switching matrix 330. Node controller 320 contains, for example, real time software and intelligent routing protocols (not shown). Router 300 supports interfaces including, but not limited to, optical signal interfaces 340 (e.g., SONET), a user interface module 350, and a management system 360. Internal input signals 370 and internal output signals 380 may be electrical or optical in nature. Router 300 preferably provides redundancy at all levels to prevent any single point system failure. All processors, memory and communications are preferably 1:1 redundant.

Node controller 320 is responsible for managing and controlling input/output section 310, which can contain multiple line cards. Some of the functions handled by node controller 320 include the periodic collection of maintenance data from the line cards, receiving and processing periodic keep-alive messages from those cards, shelf startup and configuration, proxy management, and other related functions. Each line card is coupled to two fiber optic cables, one for each direction. The fiber optic cables support a standard OC-48 or OC-192 SONET data stream. Switching matrix 330 provides routing and switching between line cards.

In one embodiment, router 300 can be used, for example, as SONET line terminating equipment (LTE) capable of terminating the Section and Line overheads of received OC-48 and OC-192 signals, and cross-connecting those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Figure 4:
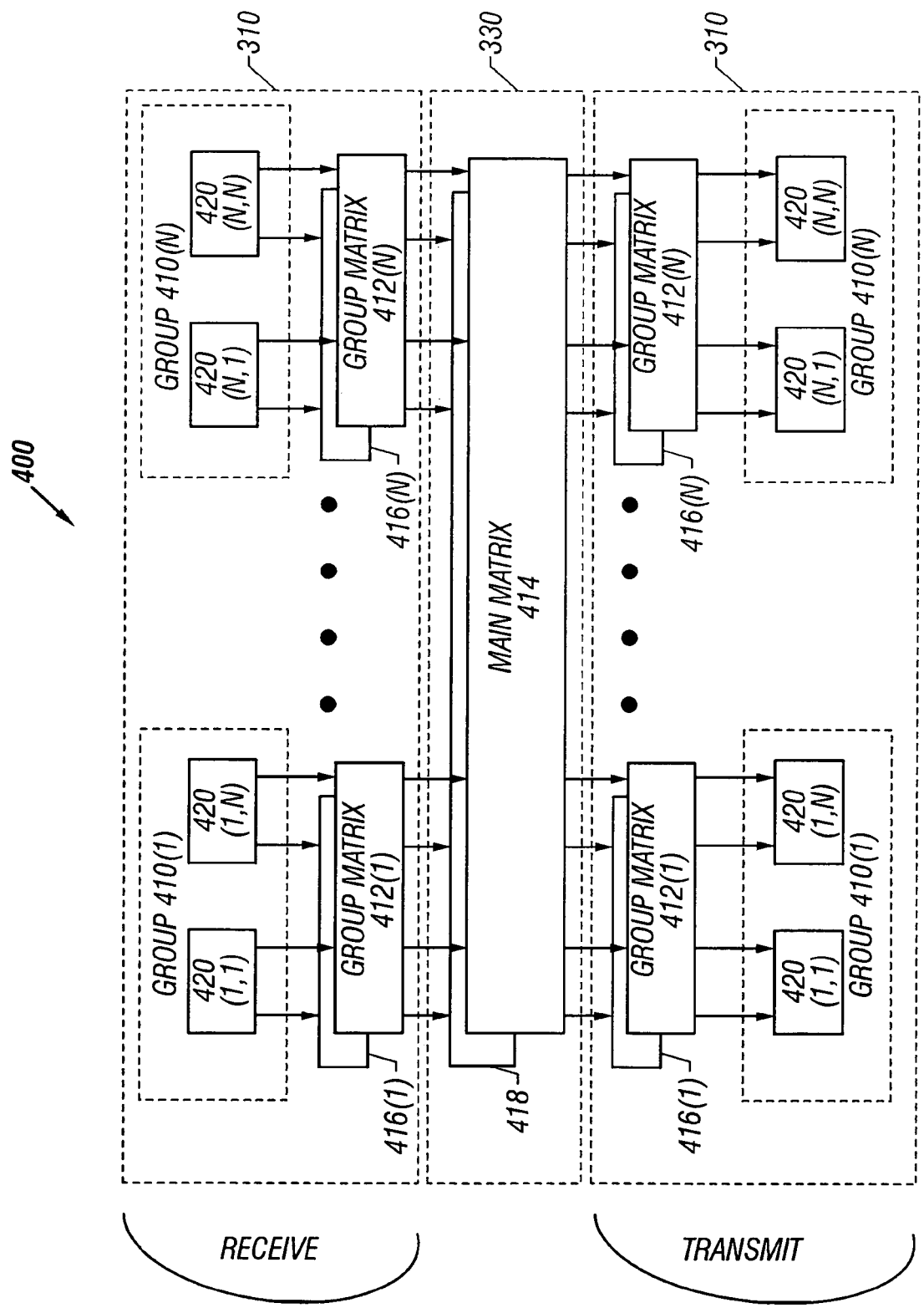
FIG. 4 illustrates a block diagram of signal paths and functional blocks of an exemplary router.

FIG. 4 is a block diagram of signal paths 400 within router 300. The primary signal paths include one or more groups exemplified by groups 410(1)–(N), group matrices 412(1)–(N), and a main matrix 414. Groups 410(1)–(N) and group matrices 412(1)–(N) have receive and transmit sections. Groups 410(1)–(N) each include line cards 420(1,1)–(1,N), through line cards 420(N,1)–(N,N). Signals from line cards 420(1,1)–(N,N) are sent to the corresponding group matrix. In one embodiment, two sets of the group matrix cards, depicted in FIG. 4 as group matrices 412(1)–(N) and 416 (1)–(N), are employed. In one embodiment, main matrix 414 is also mirrored by a redundant copy (a backup main matrix 418). Main matrix 414 and backup main matrix 418 together form switching matrix 330. As shown in FIG. 4, redundancy for group matrices 412(1)–(N) (i.e., group matrices 416(1)–(N)) exists on the transmit side.

It will be noted that the variable identifier "N" is used in several instances in FIG. 4 and other figures (and subsequent use of other variables, such as "m," "x," "k," and others) to more simply designate the final element (e.g., group matrix 412(N), line card 420(N,N), and so on) of a series of related or similar elements (e.g., group matrices 412(1)–(N), line cards 420(1,1)–(N,N), and so on). The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" (or "m," "x," "k," and others) may hold the same or a different value than other instances of the same variable identifier. For example, group matrix 412(N) may be the tenth group matrix in a series of group matrices, whereas line card 420(N,N) may be the forty-eighth line card in a series of line cards.

Using signal paths 400 as an example, data enters the system at one of line cards 420(1,1)–(N,N). It is at this point, in a SONET-based system, that the Section and Line overheads are processed and removed by a protocol processor (not shown). The extracted SONET payload envelope is then synchronized with the system clock and sent to two different copies of a local matrix, depicted as group matrices 412(1)–(N) and 416(1)–(N). In one embodiment, group matrices 412(1)–(N) and 416(1)–(N) are used mainly as 2:1 reduction stages that select one of two optical signals and pass the selected optical signal to switching matrix 330. This allows the implementation of a variety of protection schemes (including 1:N, or 0:1) without having to use any additional ports on main matrix 414. All protect signals are terminated at group matrices 412(1)–(N) and 416(1)–(N). In order to maximize bandwidth, it is preferable that only active signals be passed through to switching matrix 330.

In one embodiment, switching matrix 330 is an errorless, rearrangeably nonblocking switching network. In one embodiment, switching matrix 330 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 cross-point switch, with optical transceivers, and a microcontroller for controlling the cross-point switch.

Line cards 420(1,1)–(N,N) receive optical signals from group matrices 412(1)–(N) and 416(1)–(N) which are in turn connected to two separate copies of the main matrix. Line cards 420(1,1)–(N,N) monitor both signals for errors and, after a user-defined integration period, switch to the backup signal if that signal exhibits better signal quality, (e.g., lower bit error rate (BER)) than the prior active signal. This scheme, referred to herein as 1-plus-1, allows line cards 420(1,1)–(N,N) to select between the two copies of the group matrix without any level-1 or level-2 CPU intervention. This helps to ensure that such a switch can be made in 50 ms or less (per Bellcore's recommendations in the SONET Specification). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Figure 5:
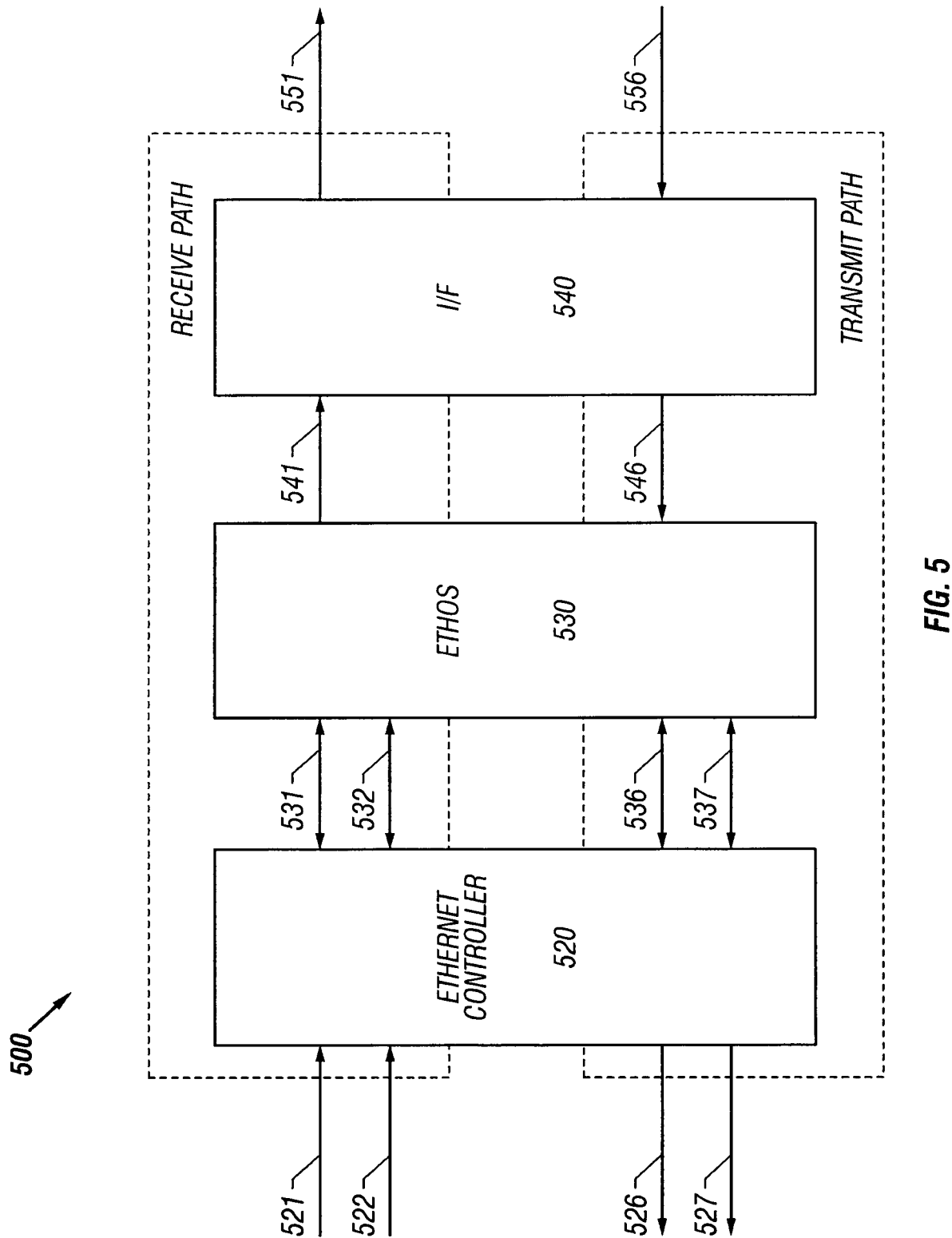
FIG. 5 illustrates a data path of an exemplary line card according to an embodiment of the present invention.

FIG. 5 illustrates a data path of an exemplary line card 500 according to an embodiment of the present invention. The data path consists of a receive data path (Ethernet to SONET) and a transmit data path (SONET to Ethernet). Ethernet controller 520 receives Ethernet data on gigabit Ethernet channels 521 and 522 in the receive data path and transmits Ethernet data on gigabit Ethernet channels 526 and 527. Ethernet controller 520 can be a commercially available device such as PM3386 Dual Ethernet Controller available from PMC-Sierra. Ethernet controller 520 typically provides a 64 K byte RAM for each gigabit Ethernet channel on the receive data path and a 16 K byte RAM for each gigabit Ethernet channel on the transmit data path. Ethernet controller 520 provides a data interface to an Ethos (Ethernet over SONET) device 530. The Ethernet data signals 531 and 532 on the receive data path and signals 536 and 537 on the transmit data path are formatted according to industry standard PL3 interface. Ethos device 530 formats the Ethernet data into a pseudo-standard STS-48c SONET frame, signal 541 in the receive data path. A pseudo-standard STS-Nc frame is a frame format that is supported by established SONET networks however the payload is not formed according to the SONET specification (for example, multiplexing two STS-24c payloads into a STS-48c payload). Ethos device 530 formats a received pseudo-standard STS-48c SONET frame, signal 546, into Ethernet data in the transmit data path. Backplane interface 540 performs backplane serialize and deserialize (serdes) functions and backplane format mapping and demapping, producing a SONET signal 551 to send to the backplane (not shown) and receiving SONET signal 556 from the backplane.

In the receive data path, Ethos device 530 first encapsulates the Ethernet payload into high-level datalink control (HDLC) frames. HDLC protocol is a common Layer 2 protocol defined by the International Standards Organization (ISO) for use on point to point and multipoint data links. The encapsulation into HDLC frames provides framing information regarding the Ethernet packets, i.e., provides information regarding the beginning and ending locations of the payload. In alternate embodiments, any type of framing information can be added, such as Generic Framing Procedure (GFP), 64B/66B, 8B/10B or any other encoding formats.

The HDLC frames, or otherwise encoded frames, are then formatted into SONET STS-24c frames. Two SONET STS-24c frames are multiplexed and formatted into pseudo-standard STS-48c frames, and sent to backplane interface 540 as signal 541. In the transmit data path, Ethos device 530 receives pseudo-standard STS-48c frames, signal 546, from backplane interface 540, interprets the incoming pointer, and extracts selected path overhead and the STS-24c frames. HDLC frames are extracted from the STS-24c frames. Ethos device 530 then extracts the Ethernet data from the HDLC frames and buffers the data for transmission on the PL3 interface to Ethernet controller 520.

Each of Ethos device 530 and backplane interface 540 can be implemented in an ASIC (application specific integrated circuit) using CMOS technology. The ASIC can be a gate array, standard cell, field programmable gate array (FPGA) or other such device integrating a high density of gates and a high degree of functionality into a single integrated circuit. The design of digital logic devices, especially those with complex architecture, is typically performed with the use of a hardware description language (HDL), such as VHDL or Verilog. HDLs are used to describe the architecture and behavior of discrete electronic systems. The circuit is described using HDL code and simulated to verify proper design and architecture. A synthesis tool converts the HDL code into a gate level implementation, optimizing the logic automatically for circuit size and speed.

FIG. 6A illustrates an exemplary receive data path 600 in Ethos device 530 according to an embodiment of the present invention. PL3 formatted gigabit Ethernet channels 601 and 602 are received by a RAM interface 610 and then stored in one of RAM 620 or 625. RAM interface 610 tracks the number of contiguous bytes received from each gigabit Ethernet channel. The number of contiguous bytes is programmable in Ethernet controller 520 to a value of 16, 32, 64 or 128 bytes. If one Ethernet channel is empty, Ethernet controller 520 transmits data from the other channel until the first channel has adequate data for transmission. RAM interface 610 can stall a channel if RAM 620 or 625 is full. Each of RAM 620 and 625 typically consists of 1K by 35 bits. RAM 620 and 625 are used for rate conversion between the Ethernet data rate and the SONET data rate and for Ethernet frame storage. Buffer overflow or underflow should never occur in normal operation because an STS-24c has larger data capacity than a one Gbps Ethernet frame. Three extra bits are added to each Ethernet frame to indicate the end of frame, the start of frame, and the number of valid bytes in the last word. A frame counter in RAM interface 610 keeps track of the number of Ethernet frames available in RAM 620 and 625.

HDLC insert blocks 630 and 635 extract Ethernet frames from RAMs 620 and 625 respectively. HDLC insert blocks 630 and 635 encapsulate the Ethernet frames into HDLC frames. HDLC encapsulation includes optionally inserting a 32 bit frame check sequence (FCS), inserting idle flags between frames, inserting fixed address, control and protocol bytes, inserting an abort sequence when required, and providing escape sequences. The HDLC formatting is according to HDLC specification and Internet Request for Comments (RFC) 2615, incorporated herein by reference in their entireties. RFC 2615 describes a point-to-point protocol (PPP) over SONET/SDH that provides a standard method for transporting multi-protocol datagrams over point-to-point links. For PPP over SONET, the entire SONET payload (here, SONET STS-24c minus path overhead) is scrambled using a self-synchronous scramble of polynomial $x^{43}+1$. Scrambling is performed to avoid malicious framing patterns.

POH (Path Overhead) insert blocks 640 and 645 each receive HDLC frames from HDLC insert blocks 630 and 635 respectively. POH insert blocks 640 and 645 format the received frames into STS-24c frames. The formatting includes inserting all path overhead.

Two STS-24c payloads (one from each of POH insert 640 and 645) are received by RX SONET formatter 650. RX SONET formatter 650 multiplexes and formats the STS-24c payloads into a pseudo-standard STS-48c signal (a signal 651). A STS-48c signal is a standard concatenated signal, i.e., one that is supported by established SONET networks. After the data is combined, transport overhead is inserted. Overhead bytes A1, A2, B1, H1, H2, and H3 are supported. All other overhead bytes are typically set to 0x00. In addition, a fixed 0x000 pointer is inserted for the STS-48c frame format and a full J1 path trace message is inserted. B3 parity byes are also computed and inserted. RX SONET formatter 640 also provides RDI-P and REI-P insertion per the SONET specification, and provides programmable insertion for C2 and F2 insertion. RX SONET formatter 640 optionally scrambles the SONET data for transmission as signal 651 to backplane interface 540.

Figure 6B:
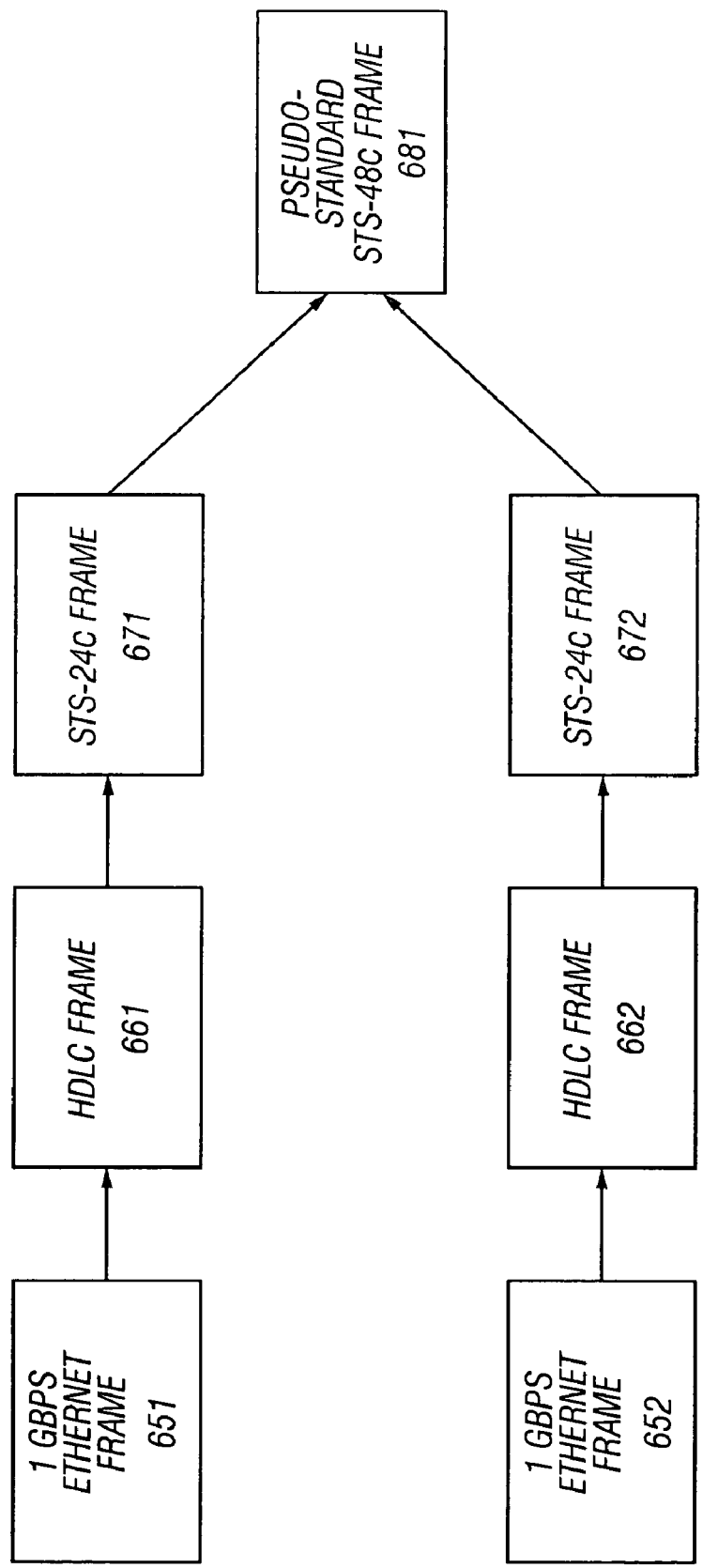

FIG. 6B illustrates the transformation of the two one Gbps Ethernet signals into a pseudo-standard STS-48c signal. Two one Gbps Ethernet signals are received, blocks 651 and 652, by RAM interface 610. The two one Gbps Ethernet signals are encapsulated into two HDLC frames, blocks 661 and 662 as described in the description of HDLC insert blocks 630 and 635. The two HDLC frames are formatted into two STS-24c frames, blocks 671 and 672, as described in the description of POH insert blocks 640 and 645. The two STS-24c frames are multiplexed and formatted into a pseudo-standard STS-48c frame, block 681, as described in the description of RX SONET formatter 650.

Figure 7A:
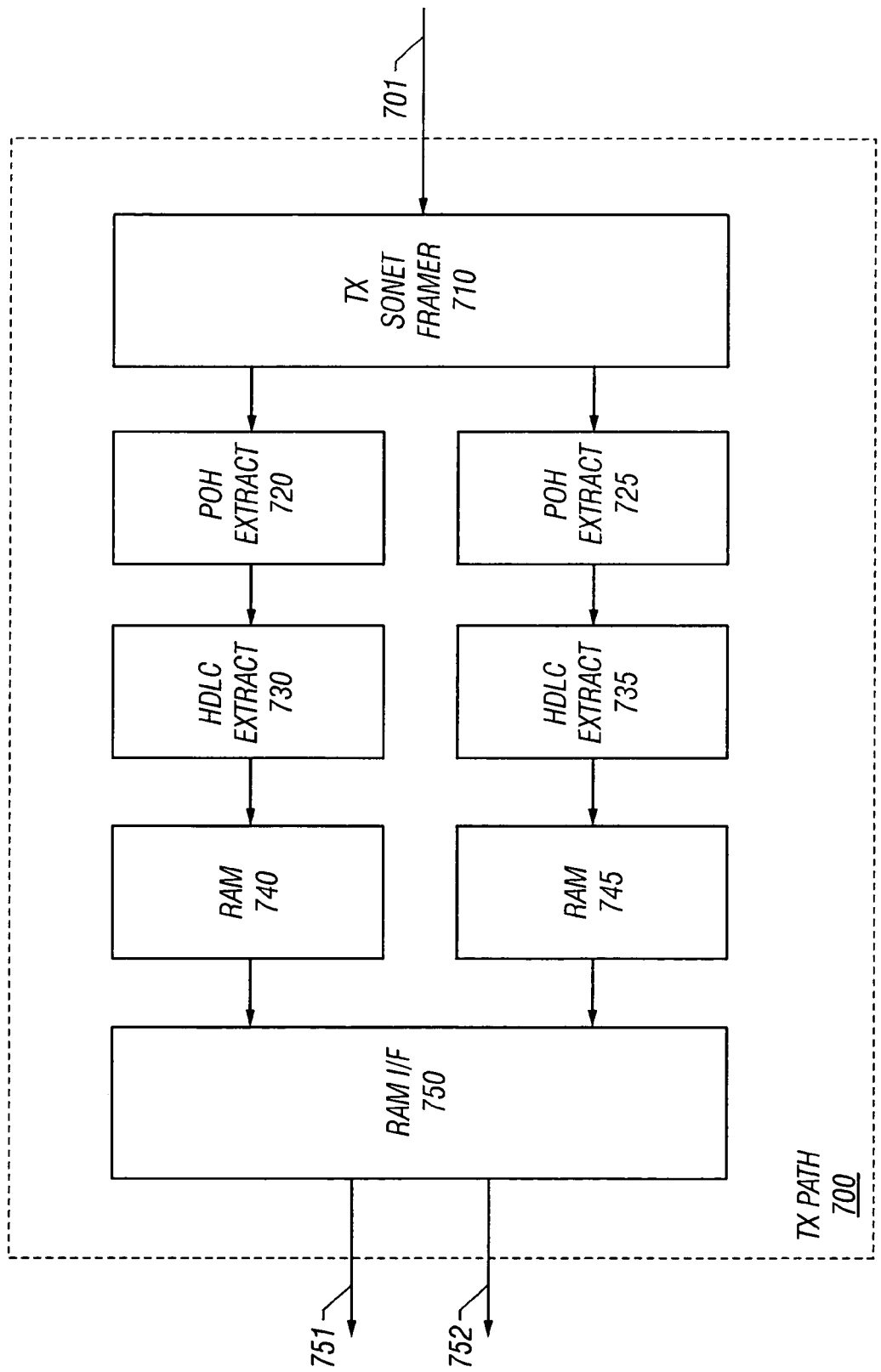
FIGS. 7A–7B illustrate an exemplary transmit data path according to an embodiment of the present invention.

FIG. 7A illustrates an exemplary transmit data path 700 in Ethos device 530 according to an embodiment of the present invention. SONET data signal 701 is received by TX SONET framer 710 that divides the data and clock down. The divided down data is framed into pseudo-standard STS-48c frames, descrambled and monitored for parity errors. The pseudo-standard STS-48c frames are framed on the A1 and A2 framing bytes in the transport overhead. Once a framing pattern is found, the framing circuitry will check after 125 microseconds for the framing pattern again. If the framing pattern is recognized again at the correct time, the in-frame condition is declared. The payload is split into two STS-24c frames, one of which is sent to POH extract block 720 and the other sent to POH extract block 725.

POH extract blocks 720 and 725 extracts the pointer and all necessary path overhead from the STS-24c SONET frames. Control signals are generated for each STS-24c frame for HDLC framing. POH extract blocks 720 and 725 detect incoming pointer defects such as loss of pointer (LOP) and alarm indication signals (AIS). Each STS-24c payload is extracted and sent to HDLC extract blocks 730 and 735.

HDLC extract blocks 730 and 735 first descramble the packets. Next, HDLC Extract blocks 730 and 735 frame to the HDLC packets and extract all HDLC overhead bytes. The two data streams are checked and all frame and escape characters are removed. HDLC extract blocks 730 and 735 check incoming HDLC 32 bit FCS and optionally abort bad FCS packets. HDLC extract blocks 730 and 735 optionally check for address, control and protocol bytes in the HDLC packet. HDLC extract blocks 730 and 735 detect idle flags, abort sequences, and escape sequences. HDLC extract blocks 730 and 735 provide a valid packet counter, a FCS error counter, and an aborted packet counter. The remaining Ethernet data streams are written into RAMs 740 and 745 for transport to Ethernet controller 520. Each of RAM 740 and 745 are 256 by 35 bits. RAMs 740 and 745 are used to retime the data from SONET rates to Ethernet rates.

Ethernet packets are extracted from RAM 740 and 745 by RAM interface 750. The data is formatted according to the PL3 standard and sent to Ethernet controller 520. RAM interface 750 determines the number of contiguous bytes transmitted to each gigabit Ethernet channels 751 and 752. The number of contiguous bytes is programmable in a memory map register to a value of 16, 32, 64 or 128 bytes. It is possible for the RAMs 740 and 745 to overflow during data burst.

Figure 7B:
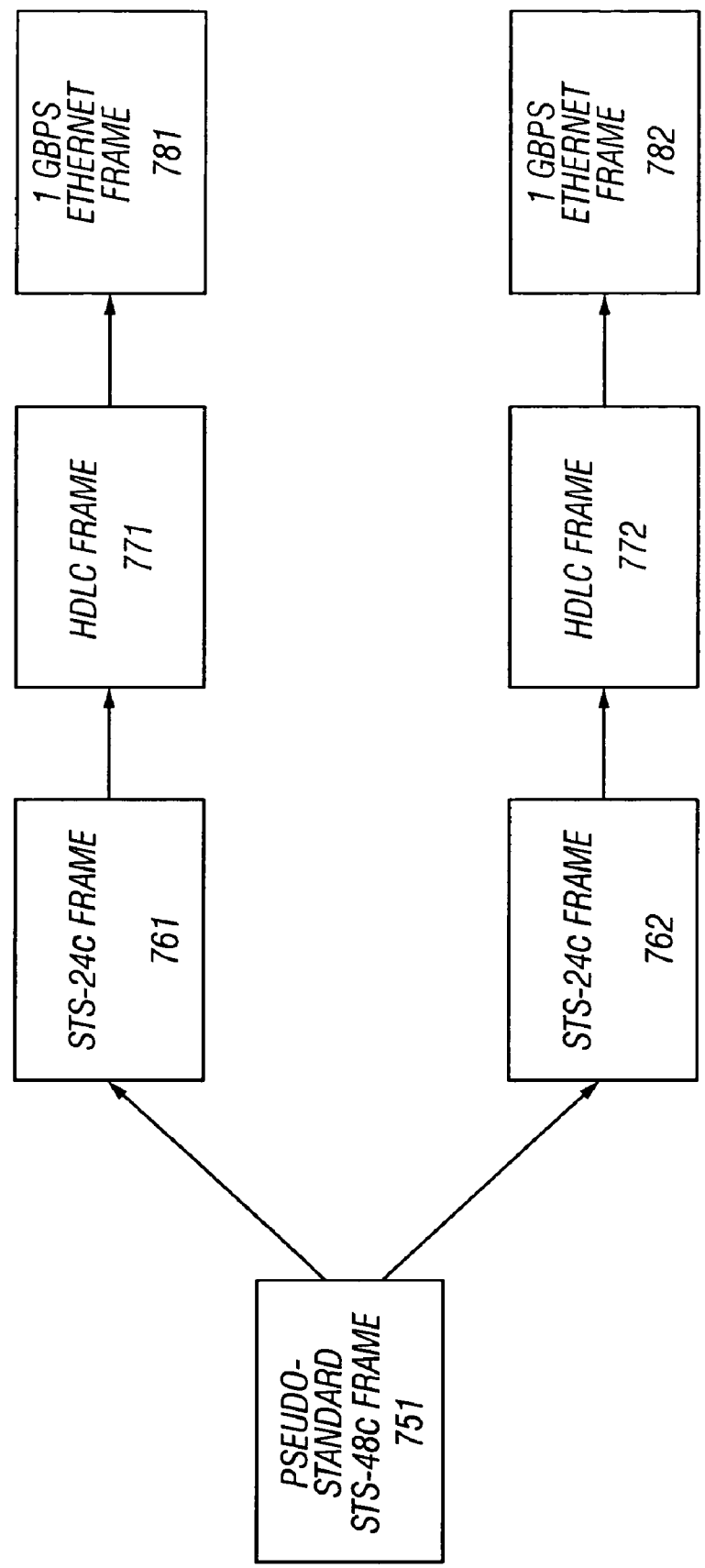

FIG. 7B illustrates the transformation of the pseudo-standard STS-48c signal into two one Gbps Ethernet signals. A pseudo-standard STS-48c signal, block 751, is received by TX SONET framer 710 which processes and removes the STS-48c overhead formatting and demultiplexes the payload into two STS-24c frames. The two STS-24c frames, blocks 761 and 762, are received and processed as described in the description of POH extract blocks 720 and 725, i.e., processing and removing of the STS-24c overhead formatting and extracting the HDLC frames. The two HDLC frames, blocks 771 and 772, are received and processed as described in the description of HDLC Extract blocks 730 and 735, i.e., processing and removing HDLC overhead bytes and extracting a one Gbps Ethernet frame from each HDLC frame. The two one Gbps Ethernet frames, blocks 781 and 732 are received by RAM interface 750 for transmission to an Ethernet controller.

Figure 8:
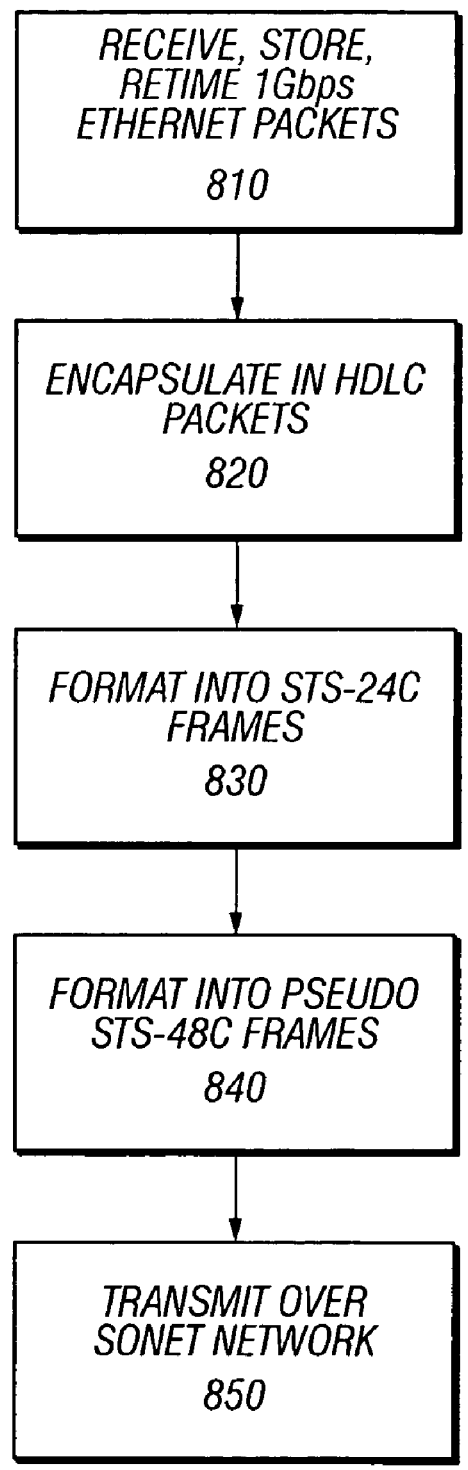
FIG. 8 illustrates a flow diagram for providing efficient transmission of one Gbps Ethernet data over established SONET networks according to an embodiment of the present invention.

FIG. 8 illustrates a flow diagram for providing efficient transmission of one Gbps Ethernet data over established SONET networks according to an embodiment of the present invention. A one Gbps Ethernet packet is received and stored in memory for retiming to the SONET data rate, block 810. The one Gbps Ethernet packet is encapsulated into an HDLC frame, block 820. HDLC encapsulation includes optionally inserting a 32 bit frame check sequence (FCS), inserting idle flags between packets, inserting fixed address, control and protocol bytes, inserting an abort sequence when required, and providing escape sequences. The HDLC frame is formatted into an STS-24c SONET frame, block 830. STS-24c formatting includes inserting all path overhead, fixed pointers (000) and decodes for H1 and J1 bytes into the payload. The STS-24c SONET frame is multiplexed with another STS-24c SONET frame and formatted into a pseudo-standard STS-48c frame, block 840. The pseudo-standard STS-48c formatting includes inserting transport overhead bytes, including A1, A2, B1, H1, H2, and H3, where all other overhead bytes are typically set to 0×00. In addition, a fixed 0×000 pointer is inserted for the STS-48c frame format and a full J1 path trace message is inserted. B3 parity byes are also computed and inserted. RDI-P and REI-P insertion is also provided per the SONET specification. C2 and F2 bytes are optionally inserted. The SONET data is optionally scrambled. The pseudo-standard STS-48c frame is transmitted across an established SONET network, block 850.

In other embodiments, any data payload that would be inefficiently mapped into standard STS-Nc frames can be encapsulated and formatted according to the present invention. The payload is encapsulated and formatted into a non-standard STS-Nc frame with a payload size of the same size or larger than the data to be transmitted. Then, two or more of the non-standard STS-Nc frames are combined and formatted to create a pseudo-standard STS-Nc frame.

In the present embodiment, the device(s) receiving the pseudo-standard STS-Nc frames are implemented to automatically extract two STS-24c packets, extract the HDLC packets, and extract the Ethernet payloads. In alternate embodiments, unused path overhead bytes can be encoded to identify the types of formatting and the frame types and sizes that are encapsulated such that any combination of payloads and sizes may be concatenated into pseudo-standard STS-Nc frames.

In another embodiment, any number and size of non-standard STS-Nc packets can be combined. For example, two STS-21C frames and one STS-6c frame can be combined to form a pseudo-standard STS-48c frame for transmission across established SONET networks.

Other embodiments are within the following claims. Also, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope

What is claimed is:

1. A method of producing bandwidth efficient SONET frames comprising:
   forming framed payloads by adding framing information to a data stream;
   formatting the framed payloads into non-standard STS-Nc frames, wherein the non-standard STS-Nc frames have lengths that are non-standard for a network; and
   formatting the non-standard STS-Nc frames into pseudo-standard STS-Nc frames.

2. The method of claim 1, wherein forming framed payloads by adding framing information to the data stream comprises adding payload beginning and ending points.

3. The method of claim 1, wherein forming framed payloads by adding framing information to the data stream comprises encapsulating the data stream into HDLC packets.

4. The method of claim 3, wherein encapsulating the data stream into HDLC packets comprises:
   inserting a 32 bit frame check sequence into each HDLC packet;
   inserting idle flags between HDLC packets;
   inserting fixed address, control and protocol bytes into each HDLC packet;
   inserting an abort sequence when required into each HDLC packet; and
   inserting escape sequences into each HDLC packet.

5. The method of claim 1, wherein formatting the framed payloads into non-standard STS-Nc frames comprises:
   inserting path overhead bytes into each non-standard STS-Nc frame; and
   inserting fixed pointers into each non-standard STS-Nc frame.

6. The method of claim 1, wherein formatting the non-standard STS-Nc frames into pseudo-standard STS-Nc frames comprises:
   multiplexing two or more of the non-standard STS-Nc frames into each pseudo-standard STS-Nc frame; and
   inserting transport overhead bytes into each pseudo-standard STS-Nc frame.

7. The method of claim 1, further comprising:
   storing and retiming the data stream prior to forming framed payloads by adding framing information to the data stream.

8. The method of claim 1, further comprising:
   transmitting the pseudo-standard STS-Nc frames over a SONET network.

9. The method of claim 1, wherein
   the data stream is a one Gbps Ethernet data stream,
   the non-standard STS-Nc frames are STS-24c frames, and
   the pseudo-standard STS-Nc frames are pseudo-standard STS-48c frames.

10. The method of claim 1, wherein the pseudo-standard STS-Nc frame is one of a pseudo-standard STS-3c, STS-12c, STS-48c, and STS-192c frame.

11. The method of claim 1, wherein the non-standard STS-Nc frames are STS-21c frames and STS-6c frames.

12. The method of claim 1, wherein a non-standard STS-Nc frame is a frame that is not supported by an established SONET network.

13. The method of claim 1, wherein a pseudo-standard STS-Nc frame is a frame that has a standard STS-Nc frame structure and formatting, and has a payload not formed according to the SONET specification.

14. The method of claim 1, wherein the framing information added to a data stream is one of HDLC, 8B/10B, 64B/66B and Generic Framing Procedure encoding.

15. A pseudo-standard STS-48c frame made by the method of claim 1.

16. The method of claim 1, further comprising:
transmitting the pseudo-standard STS-Nc frames over the network.

17. The method of claim 1, wherein the pseudo-standard STS-Nc frames have lengths that are standard for the network.

18. An apparatus for producing bandwidth efficient SONET frames comprising:
framing insertion circuitry to form framed payloads by adding framing information to a data stream;
path overhead insertion circuitry to format the framed payloads into non-standard STS-Nc frames, wherein the non-standard STS-Nc frames have lengths that are non-standard for a network; and
SONET format circuitry to format the non-standard STS-Nc frames into pseudo-standard STS-Nc frames.

19. The apparatus of claim 18, wherein framing insertion circuitry includes circuitry to add payload beginning and ending points.

20. The apparatus of claim 18, wherein framing insertion circuitry comprises HDLC insertion circuitry to encapsulate the data stream into HDLC packets.

21. The apparatus of claim 18, wherein the HDLC insertion circuitry comprises:
frame check sequence circuitry to insert a 32-bit frame check sequence into each HDLC packet;
idle flag circuitry to insert idle flags between HDLC packets;
insertion circuitry to insert fixed address, control and protocol bytes into each HDLC packet;
abort circuitry to insert an abort sequence when required into each HDLC packet; and
escape circuitry to insert escape sequences into each HDLC packet.

22. The apparatus of claim 18, wherein the path overhead insertion circuitry comprises:
path circuitry to insert path overhead into each non-standard STS-Nc frame; and
fixed pointer circuitry to insert fixed pointers into each non-standard STS-Nc frame.

23. The apparatus of claim 18, wherein the SONET format circuitry comprises:
multiplexer circuitry to combine two or more of the non-standard STS-Nc frames into each pseudo-standard STS-Nc frame; and
transport overhead circuitry to insert transport overhead bytes into each pseudo-standard STS-Nc frame.

24. The apparatus of claim 18, further comprising a memory to store and retime the data stream prior to forming framed payloads.

25. The apparatus of claim 18, further comprising a transmission circuit to transmit the pseudo-standard STS-Nc frames over the network.

26. The apparatus of claim 16, wherein:
the data stream is a one Gbps Ethernet data stream;
the non-standard STS-Nc frames are STS-24c frames; and
the pseudo-standard STS-Nc frames are pseudo-standard STS-48c frames.

27. The apparatus of claim 18, wherein the pseudo-standard STS-Nc frame is one of a pseudo-standard STS-3c, STS-12c, STS-48c, and STS-192c frame.

28. The apparatus of claim 18, wherein the non-standard STS-Nc frames are STS-21c frames and STS-6c frames.

29. The apparatus of claim 18, wherein a non-standard STS-Nc frame is a frame that is not supported by an established SONET network.

30. The apparatus of claim 18, wherein a pseudo-standard STS-Nc frame is a frame that has a standard STS-Nc frame structure and formatting, and has a payload not formed according to the SONET specification.

31. The apparatus of claim 18, wherein the pseudo-standard STS-Nc frames have lengths that are standard for the network.

32. An apparatus for producing bandwidth efficient SONET frames comprising:
means for forming framed payloads by adding framing information to a data stream;
means for formatting the framed payloads into non-standard STS-Nc frames, wherein the non-standard STS-Nc frames have lengths that are non-standard for a network; and
means for formatting the non-standard STS-Nc frames into pseudo-standard STS-Nc frames.

33. The apparatus of claim 32, wherein the means for forming framed payloads by adding framing information to the data stream comprises means for adding payload beginning and ending points.

34. The apparatus of claim 32, wherein the means for forming framed payloads by adding framing information to the data stream comprising encapsulating the data stream into HDLC packets.

35. The apparatus of claim 34, wherein the means for encapsulating the data stream into the HDLC packets comprises:
means for inserting a 32 bit frame check sequence into each HDLC packet;
means for inserting idle flags between HDLC packets;
means for inserting fixed address, control and protocol bytes into each HDLC packet;
means for inserting an abort sequence when required into each HDLC packet; and
means for inserting escape sequences into each HDLC packet.

36. The apparatus of claim 32, wherein the means for formatting the framed payloads into the non-standard STS-Nc frames comprises:
means for inserting path overhead bytes into each non-standard STS-Nc frame; and
means for inserting fixed pointers into each non-standard STS-Nc frame.

37. The apparatus of claim 32, wherein the means for formatting the non-standard STS-Nc frames into pseudo-standard STS-Nc frames comprises:
means for multiplexing two or more of the non-standard STS-Nc frames into each pseudo-standard STS-Nc frame; and
means for inserting transport overhead bytes into each pseudo-standard STS-Nc frame.

38. The apparatus of claim 32, further comprising means for storing and retiming the data stream prior to forming framed payloads.

39. The apparatus of claim 32, further comprising means for transmitting the pseudo-standard STS-Nc frames over the network.

40. The apparatus of claim 32, wherein:
the data stream is a one Gbps Ethernet data stream;
the non-standard STS-Nc frames are STS-24c frames; and
the pseudo-standard STS-Nc frames are pseudo-standard STS-48c frames.

41. The apparatus of claim 32, wherein the pseudo-standard STS-Nc frame is one of a pseudo-standard STS-3c, STS-12c, STS-48c, and STS-192c frame.

42. The apparatus of claim 32, wherein the non-standard STS-Nc frames are STS-21c frames and STS-6c frames.

43. The apparatus of claim 32, wherein a non-standard STS-Nc frame is a frame that is not supported by an established SONET network.

44. The apparatus of claim 32, wherein a pseudo-standard STS-Nc frame is a frame that has a standard STS-Nc frame structure and formatting, and has a payload not formed according to the SONET specification.

45. The apparatus of claim 32, wherein the pseudo-standard STS-Nc frames have lengths that are standard for the network.

46. A method of non-standard concatenation comprising:
identifying payloads of a size equal to or greater than an STS-1 payload;
formatting the identified payloads into non-standard STS-Nc frames, wherein the non-standard STS-Nc frames have lengths that are non-standard for a network; and
combining and formatting two or more of the non-standard STS-Nc frames into a pseudo-standard STS-Nc frame.

47. The method of claim 46, further comprising:
transmitting the pseudo-standard STS-Nc frame across the network.

48. The method of claim 46, wherein
the identified payloads are one Gbps Ethernet packets;
the non-standard STS-Nc frames are a STS-24c frames; and
the pseudo-standard STS-Nc frame is a pseudo-standard STS-48c frame.

49. The method of claim 46 wherein the pseudo-standard STS-Nc frame is one of a pseudo-standard STS-3c, STS-12c, STS-48c, and STS-192c.

50. The method of claim 46 wherein the identified payloads are one Gbps Ethernet packets.

51. The method of claim 46, wherein the pseudo-standard STS-Nc frames have lengths that are standard for the network.

52. An apparatus for producing bandwidth efficient SONET frames comprising:
framing insertion circuitry configured to form framed payloads by adding framing information to a data stream;
path overhead insertion circuitry coupled to the framing insertion circuitry and configured to format the framed payloads into non-standard STS-Nc frames, wherein the non-standard STS-Nc frames have lengths that are non-standard for a network; and
SONET format circuitry coupled to the path overhead insertion circuitry and configured to format the non-standard STS-Nc frames into pseudo-standard STS-Nc frames.

53. The apparatus of claim 52, wherein the path overhead insertion circuitry comprises:
path circuitry;
fixed pointer circuitry coupled to the path circuitry; and
decode circuitry coupled to the fixed pointer circuitry.

54. The apparatus of claim 53, wherein
the path circuitry inserts path overhead into each non-standard STS-Nc frame, and
the fixed pointer circuitry inserts fixed pointers into each non-standard STS-Nc frame.

55. The apparatus of claim 52, wherein the SONET format circuitry comprises:
multiplexer circuitry; and
transport overhead circuitry coupled to the multiplexer circuitry.

56. The apparatus of claim 52, wherein
the multiplexer circuitry combines two or more of the non-standard STS-Nc frames into each pseudo-standard STS-Nc frame, and
the transport overhead circuitry inserts transport overhead bytes into each pseudo-standard STS-Nc frame.

57. The apparatus of claim 52, further comprising a memory to store and retime the data stream prior to forming framed payloads.

58. The apparatus of claim 52, further comprising a transmission circuit to transmit the pseudo-standard STS-Nc frames over the network.

59. The apparatus of claim 52, wherein:
the data stream is a one Gbps Ethernet data stream;
the non-standard STS-Nc frames are STS-24c frames; and
the pseudo-standard STS-Nc frames are pseudo-standard STS-48c frames.

60. The apparatus of claim 52, wherein the pseudo-standard STS-Nc frame is one of a pseudo-standard STS-3c, STS-12c, STS-48c, and STS-192c frame.

61. The apparatus of claim 52, wherein the non-standard STS-Nc frames are STS-21c frames and STS-6c frames.

62. The apparatus of claim 52, wherein a non-standard STS-Nc frame is a frame that is not supported by an established SONET network.

63. The apparatus of claim 52, wherein a pseudo-standard STS-Nc frame is a frame that has a standard STS-Nc frame structure and formatting, and has a payload not formed according to the SONET specification.

64. The apparatus of claim 52, wherein the pseudo-standard STS-Nc frames have lengths that are standard for the network.

65. A method of receiving bandwidth efficient SONET frames comprising:
extracting non-standard STS-Nc frames from a pseudo-standard STS-Nc frame, wherein the non-standard STS-Nc frames have lengths that are non-standard for a network;
extracting framed payloads from the non-standard STS-Nc frames; and
extracting a data stream from the framed payloads.

66. The method of claim 65, wherein
the data stream is a one Gbps Ethernet data stream,
the non-standard STS-Nc frames are STS-24c frames, and
the pseudo-standard STS-Nc frames are pseudo-standard STS-48c frames.

67. The method of claim 65, wherein the pseudo-standard STS-Nc frame is one of a pseudo-standard STS-3c, STS-12c, STS-48c, and STS-192c frame.

68. The method of claim 65, wherein the non-standard STS-Nc frames are STS-21c frames and STS-6c frames.

69. The method of claim 65, wherein a non-standard STS-Nc frame is a frame that is not supported by an established SONET network.

70. The method of claim 65, wherein a pseudo-standard STS-Nc frame is a frame that has a standard STS-Nc frame structure and formatting, and has a payload not formed according to the SONET specification.

71. The method of claim 65, further comprising:
receiving the pseudo-standard STS-Nc frame from the network.

72. The method of claim 65, wherein the pseudo-standard STS-Nc frames have lengths that are standard for the network.

73. An apparatus for receiving bandwidth efficient SONET frames comprising:
- POH extraction circuitry to extract non-standard STS-Nc frames from a pseudo-standard STS-Nc frame, wherein the non-standard STS-Nc frames have lengths that are non-standard for a network;
- framed payload extraction circuitry to extract framed payloads from the non-standard STS-Nc frames; and
- packet extraction circuitry to extract a data stream from the framed payloads.

74. The apparatus of claim 73, wherein:
- the data stream is a one Gbps Ethernet data stream;
- the non-standard STS-Nc frames are STS-24c frames; and
- the pseudo-standard STS-Nc frames are pseudo-standard STS-48c frames.

75. The apparatus of claim 73, wherein the pseudo-standard STS-Nc frame is one of a pseudo-standard STS-3c, STS-12c, STS-48c, and STS-192c frame.

76. The apparatus of claim 73, wherein the non-standard STS-Nc frames are STS-21c frames and STS-6c frames.

77. The apparatus of claim 74, wherein a non-standard STS-Nc frame is a frame that is not supported by an established SONET network.

78. The apparatus of claim 74, wherein a pseudo-standard STS-Nc frame is a frame that has a standard STS-Nc frame structure and formatting, and has a payload not formed according to the SONET specification.

79. The apparatus of claim 73, further comprising:
- an interface configured to receive the pseudo-standard STS-Nc frame from the network.

80. The apparatus of claim 73, wherein the pseudo-standard STS-Nc frames have lengths that are standard for the network.

81. A method of producing bandwidth efficient SONET frames comprising:
- forming framed payloads by adding framing information to a data stream;
- formatting the framed payloads into non-standard STS-Nc frames, wherein the non-standard STS-Nc frames have lengths that are non-standard for a network; and
- combining two or more non-standard STS-Nc frames into a pseudo-standard STS-Nc frame;
- transmitting the pseudo-standard STS-Nc frame on the network.

82. The method of claim 81, wherein
- the pseudo-standard STS-Nc frame has a frame format that is supported by the network; and
- the pseudo-standard STS-Nc frame comprises a payload comprising two or more non-standard STS-Nc payloads.

83. The method of claim 81, wherein
- the pseudo-standard STS-Nc frame has an STS-48c format;
- the STS-48c format is supported by the network; and
- the pseudo-standard STS-Nc frame comprises a payload comprising two STS-24c payloads.

84. The method of claim 81, wherein
- the pseudo-standard STS-Nc frame has an STS-48c format;
- the STS-48c format is supported by the network; and
- the pseudo-standard STS-Nc frame comprises a payload comprising two STS-21c payloads and one STS-6c payload.

85. The method of claim 81, wherein the pseudo-standard STS-Nc frames have lengths that are standard for the network.

* * * * *